UNITED STATES PATENT OFFICE.

LEO H. BAEKELAND, OF YONKERS, NEW YORK.

CONDENSATION PRODUCT AND METHOD OF MAKING SAME.

942,809.  Specification of Letters Patent.  Patented Dec. 7, 1909.

No Drawing. Application filed October 15, 1907, Serial No. 397,560. Renewed September 17, 1909. Serial No. 518,283.

*To all whom it may concern:*

Be it known that I, LEO H. BAEKELAND, a citizen of the United States, residing at Yonkers, in the county of Westchester and State of New York, have invented certain new and useful Improvements in Condensation Products and Method of Making Same, of which the following is a specification.

This invention relates to an improved method of reacting with formaldehyde upon phenol or a phenolic body, and the improved product resulting from such reaction.

The condensation products resulting from the chemical action of aldehydes on phenols have received by further treatment some industrial applications in the manufacture of varnishes, resinous products and plastic compounds. In some cases such condensation products have been prepared by simple boiling or heating of phenol and formaldehyde without the addition of condensing agents; but such treatment does not in all cases yield the desired result, and at best the reaction is very slow, requiring about eight hours boiling with ordinary commercial phenol and formaldehyde. With pure crystallized phenol the reaction does not occur even after forty-eight hours constant boiling. It has also been proposed to use acids or salts as condensing agents, but the employment of these results in a stormy reaction, often difficult to control, and yields products containing undesirable impurities which it is difficult or impracticable to eliminate, these impurities having the effect of causing the resulting mass to darken with age or in presence of alkalies.

I have discovered that the addition in proper proportions of an organic or inorganic base to a mixture of phenol and formaldehyde, or to either component of the mixture, facilitates the reaction and yields products which are commercially far superior to those obtained by simple heating or by the use of acids or salts as condensing agents. The proportion of phenol to formaldehyde may be considerably varied, the formaldehyde being present in about the molecular proportion required for the reaction or in excess thereof. The base may be added at any phase of the process, either at the start or during the heating of the mixture, or in successive portions as the heating proceeds.

According to my invention the alkalies or bases are used in such relatively small proportions that their presence does not interfere with the desirable qualities of the products, rendering it unnecessary to eliminate them by washing or neutralizing. In fact in most cases the small amount of base persists in the final products and confers upon them new and desirable properties.

By reason of their comparative cheapness it is preferred to employ as a condensing agent ammonia, anhydrous or aqueous, ammonium carbonate, caustic alkalies or their carbonates, anilin or pyridin, but other bases as for instance the hydrates of barium, strontium, or calcium may be used. Amins and amids, and in general all derivatives of the type $NH_3$ which possess basic properties are found to act in the same manner. Similarly all basic salts, or salts which by secondary reaction engender bases, as for instance alkali sulfids, acetates and cyanids, sodium triphosphate, borax, soaps, etc., may be used; also alkali sulfites may serve, for the reason that when boiled with formaldehyde they liberate alkali in accordance with the well known reaction:

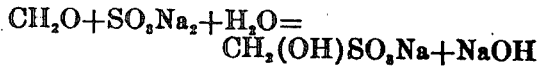
$CH_2O + SO_3Na_2 + H_2O = CH_2(OH)SO_3Na + NaOH$

The bases above referred to, and others having the requisite basic properties, are employed in variable proportions, according to their character and also according to the result desired. Additions of ammonia or caustic soda in so small a proportion as one-half per cent. of the weight of phenol used show a decided influence, but in most cases it is desirable to use somewhat larger proportions, rarely attaining however 10% by weight of the phenol or phenolic body. The proportion of bases used as condensing agents has a preponderant influence on the nature of the ultimate products. For instance, if a large amount of ammonia be used, hexamethylentetramin is formed, which is a crystalline body of definite chemical properties. (See Wohl, *Ber.*, 19, 1892; Tollens, *Ber.*, 17, 653. See also Moschatos and Tollens *Ann. der Chemie*, 272, 280.) Likewise, if large amounts of caustic soda be used there are obtained alkaline derivates of phenol-alcohol. (See Lederer, *Journal Praktische Chemie* (2), Vol. 50, page 224, and Manasse U. S. P. 526,786, 1894). It is therefore essential that the proportion of base should not exceed certain definite limits, and the maximum permissible proportion has been found to be less than one-fifth of the equimolecular proportion of phenolic body present. If larger proportions of base be used there are formed in the mass such amounts of disturbing bodies as serve to render the product technically inferior or worthless for the purposes of this invention.

It should be understood that in the case of such basic compounds as alkali sulfids, cyanids, sodium triphosphate, or those that yield bases by reaction as for instance the alkali sulfites, the proportion of salt to be used should be calculated in proportion to the quantity of base liberated.

In carrying the process into effect the reacting bodies are brought together in a suitable vessel, the most available bodies being ordinary phenol, pure or commercial, (the latter containing the homologues of phenol) and formaldehyde. If the base be strong or the amount of the same relatively large the reaction may begin at ordinary temperatures, and will be usually indicated by a separation of the liquid mixture into two superposed layers, viz., an aqueous layer consisting of separated water containing some water-soluble materials, and an oily layer containing the initial products of dehydration. The reaction is rendered more complete by heat, and this may be applied in a closed vessel, or in a vessel provided with a return condenser, in such manner as to avoid any loss of volatile materials.

The progress of the reaction may be followed by noting the increasing viscosity of the oily liquid. The heating is interrupted after a suitable consistence for the purposes in view has been attained, this condition being often reached in the course of a very few minutes. Continuation of the reaction yields a more or less viscous, elastic or semi-solid product, which for certain purposes may be preferred to the oily liquid above referred to. The oily liquid is found to be soluble in alcohol, acetone and similar solvents, and in conjunction with these forms varnishes of excellent quality.

Application of heat under proper conditions to the dry varnish renders it insoluble in all ordinary solvents, and substantially inert to acid and alkaline reagents. Instead of dissolving the oily liquid directly, it may first be concentrated further; such treatment is found to improve somewhat the qualities of the product for general purposes. It is not necessary to withdraw the oily liquid from the supernatant aqueous liquor, but the whole may be submitted to further evaporation, even to the point of becoming elastic, semi-solid or even solid at normal temperatures, the mass being still fusible and soluble in alcohol or in a mixture of alcohol and acetone.

The mass produced as above described may be hardened and rendered insoluble by the application of heat at temperatures below the boiling point of water, but it will require heating for a period ranging from several days to several weeks before the final product is sufficiently hard. However by submitting the mass under pressure in a closed vessel or mold to a higher temperature, say 120°-200° C., or even higher, as described in my co-pending application, Ser. No. 383,684, filed July 13, 1907, a compact mass of excellent properties may be quickly obtained; or a moderate temperature may be applied until the mass has become superficially hardened, and this may be followed by the application of a relatively high degree of heat to complete the hardening process.

The above treatment yields a mass which is insoluble in alcohol and all ordinary solvents, and which is unaffected or but little affected by acids, alkalies, and all ordinary chemical reagents. The mass is resistant to heat, withstanding temperatures as high as 300° C., and is infusible at all temperatures. It differs mainly from the product prepared in accordance with my copending application above referred to in that the basic condensing agent used persists in the final product as well as in the intermediate stages leading thereto.

A wide variety of compositions may be prepared by incorporating solid, semi-solid, or liquid materials of the most varied nature, the addition of such substances being made at any desired stage of the process, either before the reagents are mixed, or to the mass resulting from their reaction, or at any time before or during the final hardening. Any desired color may be imparted to the product by the addition of suitable dyes or pigments.

As examples of desirable proportions of the ingredients the following may be mentioned:

Example 1: Phenol 50 parts by weight, commercial formaldehyde 30 to 70 parts by weight, aqueous ammonia 1 to 10 parts by weight.

Example 2: Phenol 50 parts by weight, commercial formaldehyde 30 to 70 parts by weight, anilin 1 to 7 parts by weight.

Example 3: Phenol 50 parts by weight, commercial formaldehyde 30 to 70 parts by weight, commercial sodium or potassium hydroxid or carbonate 0.5 to 6 parts by weight.

I am aware that it has been proposed to dissolve phenol in substantially molecular proportions of caustic alkali with formation of a phenolate, then to react upon the phenolate with formaldehyde, afterward neutralizing the alkali by means of acid, the product in this case being a solid soluble in alcohol and in caustic potash. (See French Patent No. 361,539 to De Laire.) My method differs from the above in that it does not contemplate the employment of alkali in the large proportion described, rendering necessary its subsequent neutralization; and my product differs from that described above in that instead of being a solid soluble in alcohol it is a mass, capable of being molded and of forming homogeneous mixtures, and yielding under the influences of heat or of heat and pressure a solid mass insoluble in alcohol and in all other ordinary solvents and substantially unaffected by acid or alkaline reagents.

I claim:

1. The method which consists in reacting on a phenolic body with formaldehyde in presence of a base serving as a condensing agent, the proportion of base in the product being less than one-fifth of the equimolecular proportion of the phenolic body used.

2. The method which consists in reacting on a phenolic body with formaldehyde in presence of a base serving as a condensing agent, the proportion of base in the product being less than one-fifth of the equimolecular proportion of the phenolic body used, and separating water from the resulting product.

3. The method which consists in reacting on a phenolic body with formaldehyde in presence of a base serving as a condensing agent, the proportion of base in the product being less than one-fifth of the equimolecular proportion of the phenolic body used, separating water from the resulting product, and then hardening the same.

4. The method which consists in reacting on a phenolic body with formaldehyde in presence of a base serving as a condensing agent, the proportion of base in the product being less than one-fifth of the equimolecular proportion of the phenolic body used, separating water from the resulting product, and then hardening the same by application of heat and pressure.

5. The method which consists in reacting on a phenolic body with formaldehyde in presence of a base serving as a condensing agent, the proportion of base in the product being less than one-fifth of the equimolecular proportion of the phenolic body used, compounding the resulting body with a suitable material and then hardening the composition.

6. The method which consists in reacting on a phenolic body with formaldehyde in presence of a base serving as a condensing agent, the proportion of base in the product being less than one-fifth of the equimolecular proportion of the phenolic body used, compounding the resulting body with a suitable material and then hardening the composition by application of heat and pressure.

7. The herein described condensation product resulting from the reacting of a phenolic body and formaldehyde in presence of a base serving as a condensing agent, the proportion of base in the product being less than one-fifth of the equimolecular proportion of the phenolic body used, said product varying in its physical characteristics in accordance with the reacting conditions, and characterized by the presence of the free or combined base in quantities not exceeding the above proportions, by its insolubility in water, its solubility in alcohol or acetone, and by its capacity for transformation under heat and pressure into a solid body insoluble in alcohol, acetone or like solvents, or in acid or alkaline reagents.

8. The herein described condensation product resulting from the reaction of a phenolic body and formaldehyde in presence of a basic condensing agent, said condensation product characterized by its hardness, its insolubility in water and all known solvents, by its infusibility or resistance to heat, and by the presence therein of a proportion of free or combined base not exceeding one-fifth of the equimolecular proportion of phenolic body employed.

In testimony whereof, I affix my signature in presence of two witnesses.

LEO H. BAEKELAND.

Witnesses:
FRED R. CAREY,
H. S. TARBELL.